Figure 1:
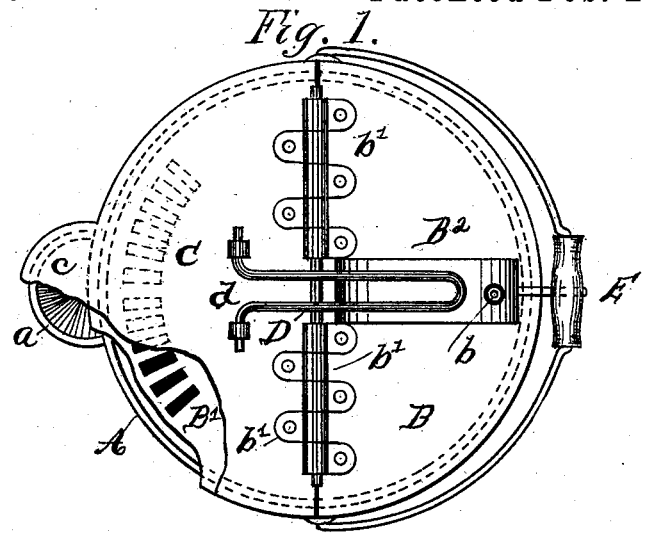

(No Model.)

A. C. CARY.
COVER FOR COOKING VESSELS.

No. 358,333. Patented Feb. 22, 1887.

WITNESSES:
John C. Miller,
Percy White.

INVENTOR:
Alicia C. Cary
John B. Wolff,
Attorney.

UNITED STATES PATENT OFFICE.

ALECIA C. CARY, OF APOPKA, FLORIDA.

COVER FOR COOKING-VESSELS.

SPECIFICATION forming part of Letters Patent No. 358,333, dated February 22, 1887.

Application filed July 10, 1885. Serial No. 171,234. (No model.)

*To all whom it may concern:*

Be it known that I, ALECIA C. CARY, a citizen of the United States of America, residing at Apopka, in the county of Orange and State of Florida, have invented certain new and useful Improvements in Covers for Cooking-Vessels, of which the following is a specification, reference being had therein to the accompanying drawings.

The objects of my improvements are, first, the complete protection of the hand while the liquid contents of vessels are discharged; second, to hold the main cover and the protector firmly in position while the liquid contents are discharged; third, to prevent the bail of the vessel from falling down upon the side and becoming heated; fourth, the construction and combination of all the parts for convenience of manipulation. These results are attained by the means illustrated in the drawings herewith filed as part hereof, in which the same letters of reference denote the same parts in the different views.

Figure 2:
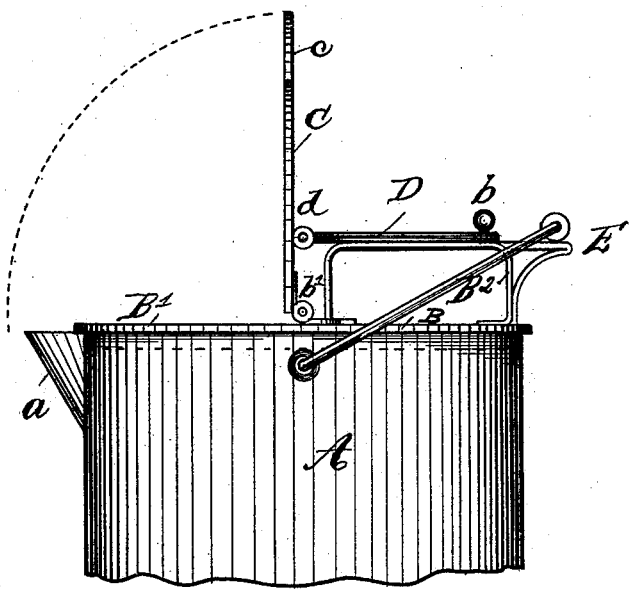

Figure 1 is a plan view of my improved cover applied to a vessel, with a part broken away. Fig. 2 is a side view of the same with the parts in different positions.

Like parts are designated by the same reference-letters throughout the drawings.

A represents a culinary vessel having a spout, a.

B is a cover for such vessel, having a perforated portion, B', generally located near the edge of that portion adjacent to the spout of the vessel. The cover is provided with a hinged flap, C, covering the perforated portion of the cover. This flap is hinged to the cover at or near the center of the cover and is provided with an extension, c, which is of such form as to cover the spout a when the flap lies upon and covers the perforations in the cover. The cover is provided with a handle, B². This handle is placed upon the cover at right angles to the line upon which the flap C is hinged, and is provided with an extension, E, which projects beyond the periphery of the cover. This part of the handle projects far enough to receive the bail of the vessel, with which culinary vessels are usually employed, and serves to hold it out of contact with said vessel, whereby it is prevented from becoming highly heated. The handle B² is also provided with a pin or projection, b, near its outer end, and the cover C has attached to it a slotted arm or loop, D, hinged thereto, which is provided at its outer end with a slot, which, when the flap C is raised into a vertical position, engages with the projection b and holds it in such position. This arm or piece b may be made of wire, as shown in the drawings. It is pivoted to the flap C at d, as shown in the drawings, so that when it is made to engage the projection b it lies closely upon the top of the said handle and can be grasped with it.

The operation of the device will be clearly understood from the above description. When the cover is upon the vessel while the latter is used in cooking, the flap C rests upon the perforated portion of the cover and closes the same, the bail of the vessel at such time being supported out of contact with the vessel by the projection E. When it is desired to strain off the contents of the vessel, the flap C is raised, the part D made to engage the projection b, and the cover held in place by grasping the handle B² and the arm D. As the kettle is tipped or inclined the liquid runs freely from the perforations in the cover, while the flap C prevents the steam from the hot contents of the vessel from rising against the hand of the operator.

What I claim, and desire to secure by Letters Patent, is—

1. The combination, with a perforated cover for culinary vessels, provided with a handle having a projection thereon, of a hinged flap covering such perforations and provided with a slotted arm hinged thereto, substantially as described.

2. The combination, with a cover for culinary vessels, of a handle attached thereto and provided with a projection extending beyond the periphery of the cover, forming a bail-rest, substantially as described.

3. The combination, with a perforated cover for culinary vessels, provided with a handle, of a hinged flap covering the perforations in said cover, and an arm pivoted to the flap, the said arm being attached to the flap at a distance from the hinge of the same equal to the height of the handle, substantially as and for the purpose set forth.

In testimony whereof I affix my signature in presence of two witnesses.

ALECIA C. CARY.

Witnesses:
D. D. SMITH,
T. D. WINTER.